US010443786B2

(12) United States Patent
Martin et al.

(10) Patent No.: US 10,443,786 B2
(45) Date of Patent: Oct. 15, 2019

(54) COMPRESSOR-LESS COOLING SYSTEM

(71) Applicant: Heatcraft Refrigeration Products LLC, Stone Mountain, GA (US)

(72) Inventors: Nicole Z. Martin, Marietta, GA (US); Ira Z. Richter, Lilburn, GA (US); Shaobo Jia, Lilburn, GA (US)

(73) Assignee: Heatcraft Refrigeration Products, LLC, Stone Mountain, GA (US)

(*) Notice: Subject to any disclaimer, the term of this patent is extended or adjusted under 35 U.S.C. 154(b) by 140 days.

(21) Appl. No.: 15/668,423

(22) Filed: Aug. 3, 2017

(65) Prior Publication Data
US 2019/0041005 A1    Feb. 7, 2019

(51) Int. Cl.
| | | |
|---|---|---|
| *F17C 7/04* | (2006.01) | |
| *F28D 20/02* | (2006.01) | |
| *F17C 9/02* | (2006.01) | |
| *F25D 23/00* | (2006.01) | |
| *F25B 21/00* | (2006.01) | |

(Continued)

(52) U.S. Cl.
CPC ............... *F17C 7/04* (2013.01); *F17C 9/02* (2013.01); *F25B 21/00* (2013.01); *F25B 23/006* (2013.01); *F25B 25/005* (2013.01); *F25D 23/003* (2013.01); *F28D 20/026* (2013.01); *F25B 2321/00* (2013.01); *F25B 2400/23* (2013.01); *F25B 2700/2109* (2013.01); *F25B 2700/21162* (2013.01); *F25B 2700/21163* (2013.01); *F28D 15/02* (2013.01)

(58) Field of Classification Search
CPC ........ F25B 7/00; F25B 21/00; F25B 2309/06; F25B 2321/00; F25B 2700/2109; F25B 2700/21162; F25B 2700/21163; F17C 7/04; F17C 9/02; F28D 15/02; F28D 20/026

USPC .................................................. 62/175, 335
See application file for complete search history.

(56) References Cited

U.S. PATENT DOCUMENTS

| | | | | |
|---|---|---|---|---|
| 2005/0016184 A1* | 1/2005 | Zhang | ................... | F25B 25/005 62/6 |
| 2007/0240428 A1* | 10/2007 | Koga | ...................... | F25B 25/00 62/3.1 |
| 2016/0003502 A1 | 1/2016 | Zelissen | | |

FOREIGN PATENT DOCUMENTS

| | | |
|---|---|---|
| EP | 2755461 A2 | 7/2014 |
| WO | 2008112554 A1 | 9/2008 |
| WO | 2016057854 A1 | 4/2016 |

OTHER PUBLICATIONS

Augusto J.P. Zimmermann and Claudio Melo "Two-Phase Loop Thermosyphon Using Carbon Dioxide Applied to the Cold End of a Stirling Cooler"; Contents list available at ScienceDirect; Applied Thermal Engineering 73 (2014) 547-556—2014.

(Continued)

*Primary Examiner* — Marc E Norman
(74) *Attorney, Agent, or Firm* — Baker Botts L.L.P.

(57) ABSTRACT

An apparatus includes a separator tank, a heat exchanger, a compressor-less heat separator, and a fluid cooler. The separator tank separates a first refrigerant into a vapor component and a liquid component. The heat exchanger is exposed to a load. The heat exchanger uses the liquid component of the first refrigerant to remove heat from a space proximate the load. The space includes at least one of a refrigeration unit and walk-in cooler or freezer. The compressor-less heat separator extracts heat from the vapor component of the first refrigerant and uses electrical power to move the heat to a second refrigerant. The fluid cooler removes heat from the second refrigerant.

17 Claims, 2 Drawing Sheets

(51) Int. Cl.
*F25B 23/00* (2006.01)
*F25B 25/00* (2006.01)
*F28D 15/02* (2006.01)

(56) References Cited

OTHER PUBLICATIONS

European Patent Office, Extended European Search Report, Application No. 18186868.8, dated Dec. 5, 2018, 7 pages.

\* cited by examiner (Prior Art)

COMPRESSOR-LESS COOLING SYSTEM

TECHNICAL FIELD

This disclosure relates generally to a cooling system.

BACKGROUND

Cooling systems may cycle a refrigerant to cool a space. Existing cooling systems may use one or more compressors to compress the refrigerant, which is then evaporated to cool a space. Cooling systems using compressors to compress vapor refrigerant suffer from low efficiency and high maintenance. Other refrigeration cycles, such as Stirling cycle refrigeration, exist but have not been successfully applied at non-cryogenic, high capacity commercial refrigeration applications typically supported by conventional vapor-refrigerant-compressing cooling systems.

SUMMARY OF THE DISCLOSURE

According to one embodiment, an apparatus includes a separator tank, a heat exchanger, a compressor-less heat separator, and a fluid cooler. The separator tank separates a first refrigerant into a vapor component and a liquid component. The heat exchanger is exposed to a load. The heat exchanger uses the liquid component of the first refrigerant to remove heat from a space proximate the load. The space includes at least one of a refrigeration unit containing the heat exchanger and walk-in cooler or freezer. The compressor-less heat separator extracts heat from the vapor component of the first refrigerant and uses electrical power to move the heat to a second refrigerant. The fluid cooler removes heat from the second refrigerant.

According to another embodiment, a method, includes separating a first refrigerant into a vapor component and a liquid component at a separator tank. The method further includes removing heat from a space proximate to the load using the liquid component of the first refrigerant from the separator tank. The space includes a heat exchanger inside a walk-in cooler or freezer. The method further includes extracting heat from the vapor component of the first refrigerant and using electrical power to move the heat to a second refrigerant at a compressor-less heat separator. The method further includes removing heat from the second refrigerant at a fluid cooler.

According to yet another embodiment, an apparatus includes a load loop, a vapor loop, and a fluid loop. The load loop includes a separator tank, a heat exchanger and a first pump. The separator tank separates a first refrigerant into a vapor component and a liquid component. The heat exchanger is exposed to a load. The heat exchanger uses the liquid component of the first refrigerant to remove heat from a space proximate to the load. The space includes at least one of a refrigeration unit containing the heat exchanger and walk-in cooler or freezer. The first pump controls a rate of flow of the liquid component of the first refrigerant from the separator tank to the heat exchanger. The vapor loop includes the separator tank and a compressor-less heat separator. The compressor-less heat separator extracts heat from the vapor component of the first refrigerant received from the separator tank and uses electrical power to move the heat to a second refrigerant. The fluid loop includes the compressor-less heat separator, a fluid cooler, and a second pump. The fluid cooler removes heat from the second refrigerant received from the compressor-less heat separator. The second pump controls a rate of flow of the second refrigerant between the fluid cooler and the compressor-less heat separator.

Certain embodiments may provide one or more technical advantages. For example, certain embodiments of compressor-less cooling systems and methods may be more efficient than conventional vapor-compression refrigeration systems and methods used for high capacity cooling or refrigeration. For example, compressor-less cooling systems avoid inherent inefficiencies of the vapor-compression cycle and may utilize more efficient refrigeration cycles to provide cooling. As another example, certain embodiments may use natural refrigerants, e.g., a carbon dioxide refrigerant, eliminating the need for hydrofluorocarbon (HFC) refrigerants that may be optimized for vapor-compression cycles. Using natural refrigerants reduces the environmental impact of cooling systems compared to conventional cooling systems. As yet another example, certain embodiments of compressor-less cooling systems and methods may require less maintenance compared to conventional systems. In particular, the removal of compressors reduces a major maintenance/failure point in conventional vapor-compression cooling systems. Furthermore, certain embodiments of compressor-less cooling systems and methods may reduce noise generated while during operation. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
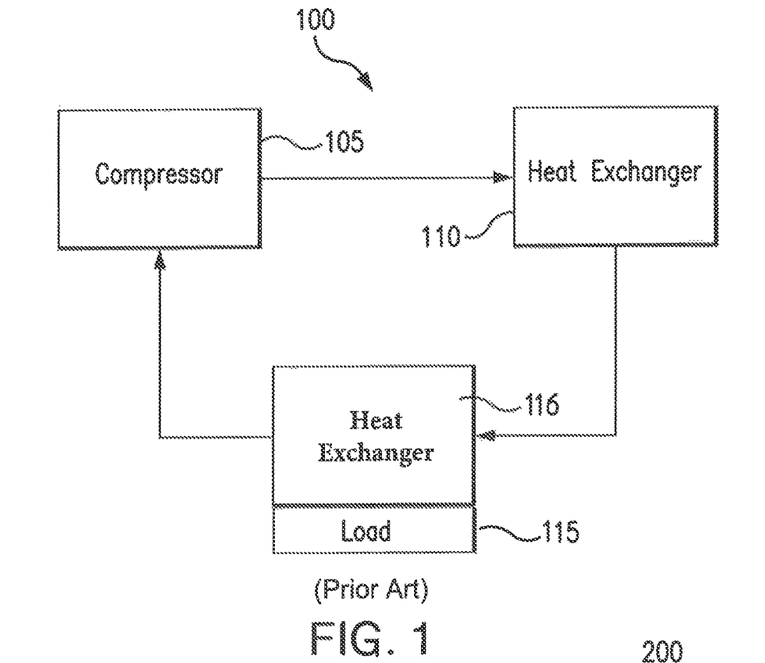
FIG. 1 illustrates an example vapor-compression cycle cooling system.
Figure 2:
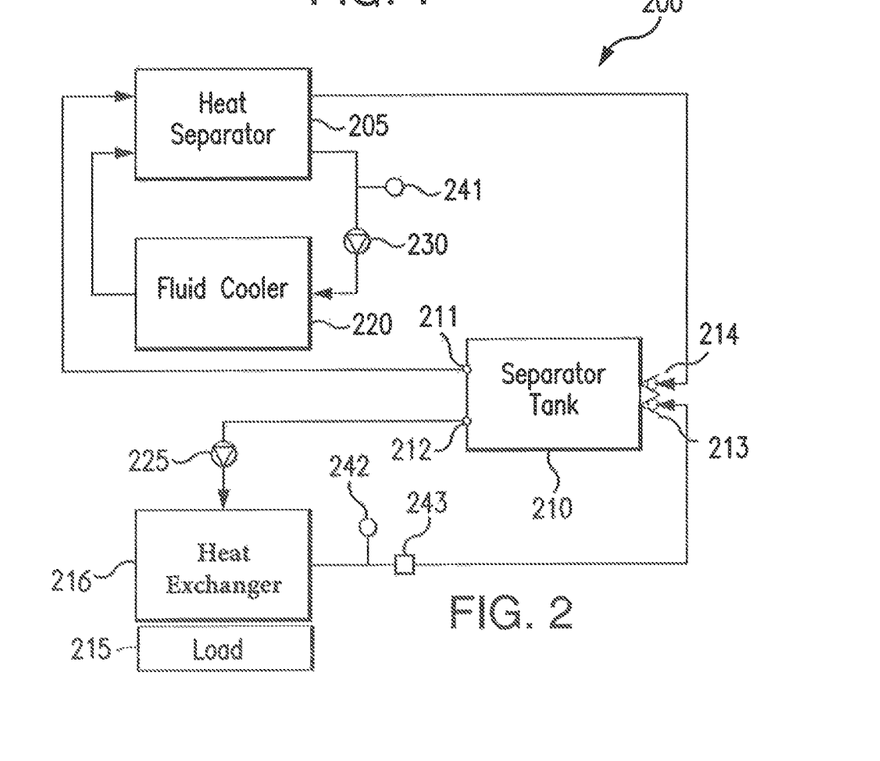
FIG. 2 illustrates an example compressor-less cooling system.
Figure 3:
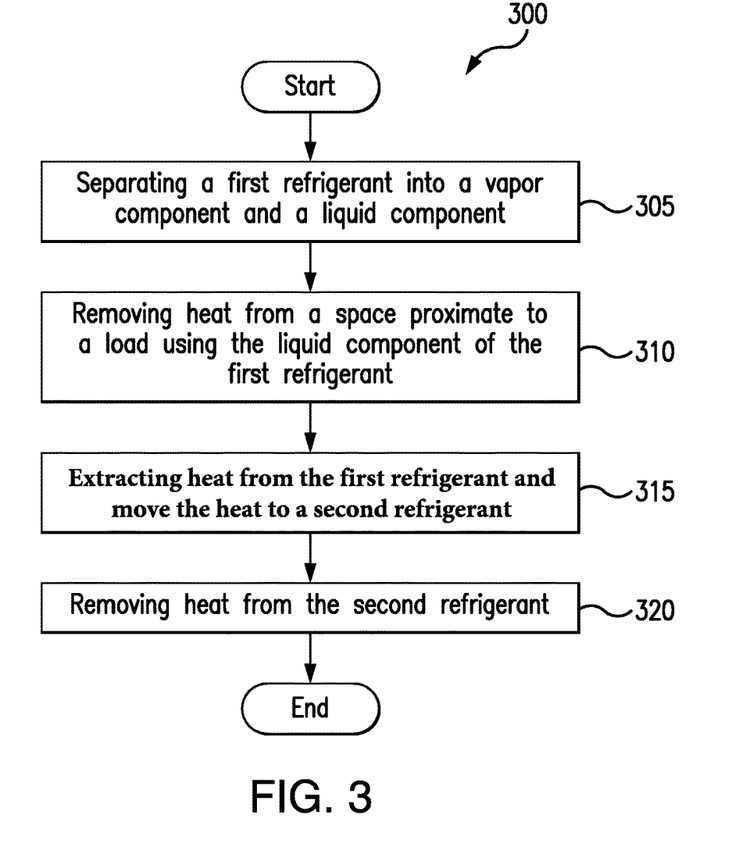
FIG. 3 is a flowchart illustrating a method of operating the example compressor-less cooling system of FIG. 2.

Embodiments of the present disclosure and its advantages are best understood by referring to FIGS. 1 through 3 of the drawings, like numerals being used for like and corresponding parts of the various drawings.

Cooling systems, such as for example refrigeration systems, use a refrigerant to remove heat from a space. These systems may cycle refrigerant through a plurality of loads located through a building. For example, in a grocery store, loads may be freezers used to store frozen foods or refrigerated shelves used to store fresh produce. Refrigerant may cycle through these freezers and shelves where it is used to remove heat from those spaces.

Existing conventional large capacity refrigeration systems, such as those systems used in commercial spaces, use vapor compression refrigeration. Generally, systems utilizing vapor compression refrigeration cycle a refrigerant through a compressor, which compresses the refrigerant, then through a first heat exchanger, which removes heat from the refrigerant, and then to a second heat exchanger, which uses the refrigerant to remove heat from a space proximate to a load. Typically, the refrigerant is expanded at the second heat exchanger exposed to the load such that it changes from a liquid to a gaseous state. This phase change allows refrigerant within the second heat exchanger to receive heat from the air circulating in the space proximate to the load. For example, in commercial refrigeration systems the load reside within a walk-in freezer or a cooler or an enclosed space in which items are kept at a lower temperature than the ambient temperature.

FIG. 1 illustrates a typical vapor compression refrigeration cycle in a generalized manner. Cooling system 100 comprises a compressor 105, a first heat exchanger 110 and a second heat exchanger 116 exposed to load 115. Refrigerant flows between compressor 105, first heat exchanger 110, and second heat exchanger 116. The refrigerant is first compressed at compressor 105. Refrigerant flows from compressor 105 to first heat exchanger 110. First Heat exchanger 110 transfers heat from the refrigerant to the ambient air or another heat transfer medium, e.g., a fluid or a second refrigerant. In first heat exchanger 110, the refrigerant may change phases or otherwise change its temperature or heat in order to be suitable for removing heat from load 115. For example, first heat exchanger 110 may be a condenser in which the first refrigerant changes from a gaseous state to a liquid state. After first heat exchanger 110, the refrigerant may flow to a second heat exchanger 116 exposed to heat load 115. At load 115, the refrigerant within second heat exchanger 116 may be used to remove heat from a space proximate to load 115. Load 115 may be a load from a commercial refrigerator, cooler, walk-in freezer, refrigerated display cases, ice machines, chillers, air conditioning apparatuses or similar apparatus. The refrigerant at load 115 may be subject to heat transfer such that first refrigerant increases in temperature and/or changes phases from a liquid to a gaseous state. After load 115, first refrigerant may be cycled back to compressor 105 wherein the cycle may be repeated. In this manner, cooling system 100 represents a generalized refrigeration cycle that is embodies the conventional vapor-compression refrigeration cycle.

Conventional refrigeration cycles such as those represented by cooling system 100 in FIG. 1 have several disadvantages. For example, the vapor-compression refrigeration cycle is less efficient than other refrigeration cycles, such as the Stirling cycle. As another example, conventional vapor-compression refrigeration systems use hydrofluorocarbons (HFCs) and do not easily accommodate the use of natural refrigerants, such as carbon dioxide ($CO_2$), which may be more environmentally friendly. For example, natural refrigerants may require additional considerations in their application, and thus complicate the simple vapor-compression systems that use HFCs. Using $CO_2$ requires high pressures (requiring more expensive components and piping) and loses efficiency at high ambient temperatures (necessitating compensating by adding components to increase efficiency). Ammonia is toxic, flammable, and cannot be used with copper tube and piping. Hydrocarbons are highly flammable and currently not allowed by building codes.

Several measures have been introduced to deal with the various drawbacks of the vapor-compression cycle, including adding components to increase efficiency or allow for the use of natural refrigerants. In addition, typical vapor-compression cycle compressors and other components have less favorable life cycle climate performance (LCCP) ratings, which represent the higher environmental impact these systems have over their lifetime. Moreover, the typical components of vapor-compression cycle refrigeration systems, including the compressors, produce a large amount of noise, which may render certain spaces unusable during operation or inconvenience customers or employees or prevent regulatory compliance in some markets in which noise is regulated. Instead of attempting to provide marginal improvements to systems using the vapor-compression cycle, what is needed are alternative refrigeration systems which obviate the need for a compressor and are also able to operate with high capacity, matching systems using the vapor compression cycle.

This disclosure contemplates various embodiments of cooling systems and methods of cooling a space which utilize a compressor-less heat separator. The compressor-less heat separator may be any suitable heat transfer device that is able to receive two fluids and exchange heat between them without the use of a compressor. In certain embodiments, the compressorless heat separator may use a third fluid to accomplish its function. For example, the heat separator may be a high capacity Stirling cooler, a thermoelectric cooler, a magnetic cooler, or a thermoacoustic cooler. The use of such heat separators allows the removal of any compressor devices that are the main source of many of the drawbacks discussed above in the vapor-compression cycle. Although non-vapor compression cycles have been contemplated before, this disclosure includes various systems and methods that are able to utilize compressor-less heat separators for high capacity refrigeration. For example, certain embodiments may include commercial refrigeration devices such as a walk-in cooler, freezer, or large-scale coolers. A heat separator on its own is unable to provide such cooling and requires additional components to provide the high capacity refrigeration in a controlled manner. The control of the heat transfer using the heat separator requires different considerations than those concerned with the vapor-compression refrigeration systems, and are contemplated herein.

Certain embodiments may provide one or more technical advantages. For example, certain embodiments of compressor-less cooling systems and methods may be more efficient than conventional vapor-compression refrigeration systems and methods used for high capacity cooling or refrigeration. For example, compressor-less cooling systems avoid inherent inefficiencies of the vapor-compression cycle and may utilize more efficient refrigeration cycles to provide cooling. As another example, certain embodiments may use natural refrigerants, e.g., a carbon dioxide refrigerant, eliminating the need for hydrofluorocarbon (HFC) refrigerants that may be optimized for vapor-compression cycles. Using natural refrigerants reduces the environmental impact of cooling systems compared to conventional cooling systems. As yet another example, certain embodiments of compressor-less cooling systems and methods may require less maintenance compared to conventional systems. In particular, the removal of compressors reduces a major maintenance/failure point in conventional vapor-compression cooling systems. Furthermore, certain embodiments of compressor-less cooling systems and methods may reduce noise generated while during operation. Certain embodiments may include none, some, or all of the above technical advantages. One or more other technical advantages may be readily apparent to one skilled in the art from the figures, descriptions, and claims included herein.

FIG. 2 illustrates an example cooling system 200. Cooling system 200 includes a heat separator 205, a separator tank 210, a heat exchanger 216 exposed to a load 215 and a fluid cooler 220. As illustrated in FIG. 2, the various components of cooling system 200 may be connected by any number of various types of pipes, tubing, or similar means which are suitable to flow fluid under a pressure and temperatures typical of typical refrigerants and commercial cooling systems.

Cooling system 200 may be considered as having three circuits or loops. For example, cooling system 200 may have a "load loop" which includes separator tank 210 and heat exchanger 216 exposed to load 215. A first refrigerant may flow from separator tank 210 to heat exchanger 216. In a similar manner as described with respect to FIG. 1, heat exchanger 216 may use the first refrigerant in removing heat from a space proximate to load 215. Load 215 may comprise a load from one or more of a commercial refrigerator, cooler, walk-in freezer, refrigerated display cases, ice machines, chillers, air conditioning apparatuses and/or similar apparatus. In certain embodiments, the space proximate to load 215 may include at least one of a refrigeration unit and a walk-in freezer. After removing heat from a space proximate to load 215, the first refrigerant may flow back to separator tank 210 through a first inlet 213. The loop may repeat continuously or may be cycled on and off according to various control mechanisms and/or automatic criteria.

Cooling system 200 may also have a "vapor loop" in which a vapor component of the first refrigerant may flow from separator tank 210 to heat separator 205 and back into separator tank 210 through a second inlet 214. For example, a vapor component of first refrigerant may flow from vapor outlet 211 to heat separator 205. At heat separator 205, electricity may be used to extract heat from the first refrigerant move heat to a second refrigerant. After heat is extracted from the vapor component of the first refrigerant, the first refrigerant may flow back to separator tank 210 through second inlet 214. After heat is extracted from the vapor component of first refrigerant in heat separator 205, the first refrigerant flowing from heat separator 205 may comprise a liquid component of the first refrigerant as a result of the lower heat and/or pressure within first refrigerant after the transfer of heat in heat separator 205. In some embodiments, the first refrigerant flowing from heat separator 205 may include only a liquid component of the first refrigerant.

Cooling system 200 may also have a "fluid loop" which comprises heat separator 205 and fluid cooler 220. The second refrigerant may flow between heat separator 205 and fluid cooler 220. For example, the second refrigerant may flow from fluid cooler 220 to heat separator 205. Inside heat separator 205, heat is extracted from the first refrigerant using electricity and the extracted heat is moved to the second refrigerant. After heat is transferred from the first refrigerant to the second refrigerant, the second refrigerant may further transfer heat into fluid cooler 220 in which heat is transferred to another medium such as the ambient environment around fluid cooler 220. As described above, these three loops make up a compressor-less cooling system 220 that uses a first refrigerant and a second refrigerant in order to service load 215. While this particular configuration may be used to utilize heat separator 205 for high-capacity cooling, other such combinations of loops using heat separator 205 may be contemplated.

Cooling system 200, in certain embodiments, may further include a first pump 225. First pump 225 may control a rate of flow of the liquid component of the first refrigerant from separator tank 210 to heat exchanger 216 exposed to load 215. For example, first pump 225 may comprise various settings that control the rate of flow of the first refrigerant between separator tank 210 and heat exchanger 216. As an example, when additional heat transfer is required at to remove heat at load 215, first pump 225 may operate at a higher setting such that the first refrigerant is flowed at a higher rate from separator tank 210 to heat exchanger 216.

In certain embodiments, the flow rate of the vapor portion of the first refrigerant to heat separator 205 may be a result of the heat exchange by heat exchanger 216 exposed to load 215. For example, when load 215 at heat exchanger 216 causes more liquid in heat exchanger 216 to evaporate, e.g., at a unit cooler of heat exchanger 216, more of the vapor component of the first refrigerant is available to heat separator 205. In this case, if heat separator 205 has enough capacity at its operator power at this time, heat separator 205 may condense more of the supplied vapor component of the first refrigerant to send back to separator tank 210.

In certain embodiments, cooling system 200 may not include pump 225 or any pump between separator tank 210 and heat exchanger 216 exposed to load 215. For example, cooling system 200 may be configured such that the liquid component of the first refrigerant is flowed to heat exchanger 216 without pump 225. Similarly, the vapor component of the first refrigerant may be provided to heat separator 205. In this manner, certain embodiments may have a simplified configuration without the need of pump 225. Separator tank 210 may include any suitable components with which the liquid component and the vapor component of a refrigerant or other heat transfer media may be separated. In certain embodiments, separator tank 210 may include first inlet 213 and second inlet 214 that is configured to receive the first refrigerant. For example, first inlet 213 may receive the first refrigerant in a vapor-only or a 2-phase mixture of vapor and liquid from heat exchanger 216. As another example, second inlet 214 may receive first refrigerant in substantially a liquid phase, and in some cases, only in a liquid phase without a vapor component. In some embodiments, first inlet 213 and second inlet 214 are distinct inlets, both residing above the liquid level in separator tank 210. In certain embodiments, separator tank 210 may include more than one inlet in which vapor and liquid may flow into separator tank 210 separately. Various separation tanks may be contemplated. For example, any suitable vapor-liquid separation tanks, such as flash gas tanks and other refrigerant vapor liquid separators may be contemplated in this disclosure.

In certain embodiments, separator tank 210 within cooling system 200 may be configured to prevent any liquid component of the first refrigerant from flowing to heat separator 205. Heat separator 205 may only use a vapor component of the first refrigerant in which to transfer heat to the second refrigerant. Liquid flowing to heat separator 205 may decrease the efficiency of heat separator 205 by reducing the latent heat extraction at heat separator 205. In this manner, providing only a vapor component of the first refrigerant to heat separator 205 may increase its efficiency and the amount of heat available for extraction. Separator tank 210 provides simple and effective control of the flow of the first refrigerant while still enabling the efficient heat transfer at heat exchanger 216 and heat separator 205.

Fluid cooler 220 may comprise any suitable fluid cooling device. In certain embodiments, fluid cooler 220 may include a coil and fan combination which enables heat transfer from the second refrigerant to the air passing over the coils using the fan. Other fluid cooling devices may be used in combination or in the alternative. For example, direct or indirect evaporative cooling may be used in conjunction with the coil and fan combination in fluid cooler 220. In another example, an additional liquid may be used by fluid cooler 220 to transfer heat from second refrigerant.

In particular embodiments, the additional liquid may be part of a heat reclamation system. For example, the additional liquid may be water that may be heated with the waste heat from heat separator 205. In this example, the heated water may reduce the need to provide energy to heat water for use as sanitary hot water in a supermarket or restaurant. In this manner, additional efficiencies may be provided by cooling system 200.

In certain embodiments, the first refrigerant comprises carbon dioxide. Carbon dioxide is an environmentally friendly alternative to conventional refrigerants, but in conventional cooling systems, such as the cooling system 100, using carbon dioxide results in lower efficiency at high ambient temperatures and requires the use of additional components to negate some of the disadvantages compared to HFCs or other artificial refrigerants. Using carbon dioxide as the refrigerant may also require more expensive components that are rated at higher pressures. Cooling system 200 may use, however, natural refrigerants, such as carbon dioxide, while maintaining high efficiency and simplified construction. In this manner, cooling system 200 allows heat separator 205 to use refrigerants, such as natural refrigerants, with high efficiency without overly complex or expensive configurations or components.

The second refrigerant used in heat separator 205 and fluid cooler 220 may include any suitable refrigerant. In certain embodiments, the second refrigerant may include water. In some embodiments, the second refrigerant may include a water-glycol mixture. For example, heat separator 205 may be configured to receive a water-glycol mixture at a low temperature portion and eject the water-glycol mixture to the fluid cooler 220 after transferring heat from the first refrigerant. In this manner, a water-glycol mixture may provide an easy and cost-effective second refrigerant that requires little maintenance and is easily replaced. In certain embodiments, more efficient or advanced refrigerants may be used for second refrigerant. In some embodiments, additional equipment may be used in conjunction with the different refrigerants.

In certain embodiments, heat separator 205 may be a compressor-less heat transfer device which uses a power source to extract and move heat. For example, heat separator 205 may be a thermal electric heat transfer device. In another example, heat separator 205 may be a magnetic heat transfer device. In a further example, heat separator may be a thermo-acoustic heat transfer device. In yet another example, heat separator 205 may be a Stirling cycle heat transfer device. These example compressor-less heat transfer devices do not require additional compression in order to move heat from the first refrigerant to the second refrigerant. In the case of Stirling cycle and thermoacoustic heat transfer devices, a third refrigerant may be used to effectuate the heat transfer. For example, the third refrigerant may be used with the application of electrical power to move the heat from the first refrigerant to the second refrigerant. The removal of the compressor from cooling or refrigeration systems provides several advantages as discussed above. In particular, compressor-less cooling systems may be more efficient, require less maintenance, lessen environmental impact, and generate less noise. One further advantage of certain embodiments disclosed herein is the ability to easily scale load 215 serviced by heat separator 205 as more efficient and higher capacity compressor-less heat transfer devices are developed.

In addition, compressor-less heat transfer devices may include additional efficiency factors over traditional compressor systems. For example, compressor-less devices may retain higher efficiency at part-load conditions due to the ability to retain high efficiency at less than full power. In contrast, vapor-compression systems typically only are efficient in certain power ranges and typically cycled to run only at those full load conditions. The vapor-compression systems pay a efficiency penalty associated with each on-off cycle.

In certain embodiments, cooling system 200 may include one or more sensors. For example, as shown in the embodiment disclosed in FIG. 2, cooling system 200 may include a first temperature sensor 241. Temperature sensor 241 may be coupled to the cycle including heat separator 205 and fluid cooler 220 as depicted in FIG. 2. Temperature sensor 241 may be configured to measure a temperature of the second refrigerant as it flows between heat separator 205 and fluid cooler 220. This temperature may represent the amount of heat transfer heat separator 205 and/or the amount of heat transfer at fluid cooler 220. In certain embodiments, a temperature value from temperature sensor 241 may compared to a temperature set point. Based on that comparison between the measured temperature from temperature sensor 241 and the temperature set point, the rate of flow of the second refrigerant may be increased between heat separator 205 and fluid cooler 220. For example, if the temperature of the second refrigerant reaches above a certain temperature threshold, a pump, such as second pump 230, may be operated to increase the flow of the refrigerant at a higher rate between heat separator 205 and fluid cooler 220. As a result, heat separator 205 may be provided with more capacity for heat transfer using the second refrigerant, e.g., more heat may be transferred from the first refrigerant to the second refrigerant at a higher rate due to the increased flow of the second refrigerant.

In particular embodiments, cooling system 200 may include one or more fans configured to blow air across heat exchangers in cooling system 200, including one or more of fluid cooler 220 and heat exchanger 216. In some embodiments, the one or more fans are variable speed fans. The speed of fans may be varied based on the load exposed to the heat exchangers. For example, the speed of a fan proximate to heat exchanger 216 may be increased in response to an increase of load 215 in order to remove more heat from the space proximate load 215. In certain embodiments, based on that comparison between the measured temperature from temperature sensor 241 and the temperature set point, the speed of one or more fans may be increased to increase heat transfer.

In certain embodiments, other components of cooling system 200 may be controlled using temperature values from temperature sensor 241. In some embodiments, fluid cooler 220 may change its operation state if the measured temperature of the second refrigerant exceeds a threshold or predetermined value. For example, fluid cooler 220 may be controlled to turn on a fan or increase the speed of a fan or any other heat-transfer media moving device to increase the heat transfer from second refrigerant at fluid cooler 220.

In certain embodiments, cooling system 200 may also comprise pressure sensor 243 and temperature sensor 242. In such embodiments, one or more of pressure sensor 243 and temperature sensor 242 may be used to control the flow of the first refrigerant. For example, in certain embodiments, pressure sensor 243 may be configured to measure a pressure of the first refrigerant and temperature sensor 242 may be configured to measure a temperature of the first refrigerant. The measurement of the temperature and pressure of the first refrigerant may be used to determine a load value that is based on the measured temperature and pressure. This load value may be compared to a set point. For example, the load value may be compared to a set point based on a refrigerant curve, such as a P-T curve, that represents the desired cooling at load 215 or of the space proximate to load 215. Based on the comparison of the load value and the set point, the rate of flow of the first refrigerant to heat exchanger 216 may be increased. For example, first pump 225 may be operated at a higher rate to flow the first refrigerant at a higher rate from separator tank 210 to heat exchanger 216 and from separator tank 210 to heat separator 205. As another example, a speed of a fan proximate to heat exchanger 216 may be increased based on a comparison of the load value and the setpoint.

Figure 4:
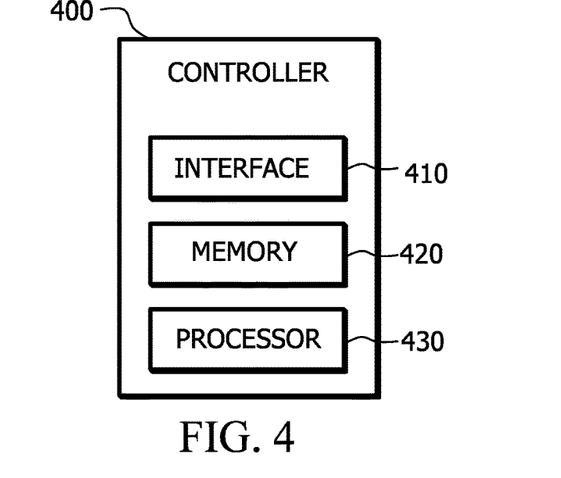
FIG. 4 illustrates an example controller used with a compressor-less cooling system.

Cooling system 200 may also include a controller, such as controller 400 described in FIG. 4. The controller, e.g., controller 400, may be coupled to one or more components of cooling system 200. For example, in certain embodiments controller 400 may be communicatively coupled to temperature sensor 241. Controller 400 may be configured to compare the measured temperature to a set point and based on that comparison, increase a rate of flow of the liquid component of the first refrigerant to heat exchanger 216. In certain embodiments, controller 400 may be coupled to fluid cooler 220. In such embodiments, controller 400 may be configured to increase a speed of fan in fluid cooler 220 to increase the heat transfer from second refrigerant to the ambient temperature or to another heat transfer medium. In certain embodiments, controller 400 may be coupled to second pump 230. For example, controller 400 may be configured to change the rate at which second pump 230 operates, thereby controlling the rate of flow of the second refrigerant between heat separator 205 and fluid cooler 220. In this manner, controller 400 may be configured to control the heat transfer rate and capacity of the second refrigerant in heat separator 205.

In certain embodiments, controller 400 may be coupled to the pressure sensor 243 and temperature sensor 242. Controller 400 may be configured to determine a load value based on a measured temperature from temperature sensor 242 and the pressure measured with pressure sensor 243. Controller 400 may be further configured to compare the load value to a set point and based on the comparison, increase the rate of flow of the liquid component of the first refrigerant to heat exchanger 216. For example, in certain embodiments, controller 400 may be coupled to first pump 225 and operable to change the rate of flow of first refrigerant by changing the state of first pump 225. By increasing the flow rate through first pump 225, the liquid component of first refrigerant may flow at a higher rate from separator tank 210 to heat exchanger 216, thereby increasing the heat transfer capacity of the first refrigerant at load 215.

Various set points and predetermined values may be used in order to control various components of system 200. For example, a temperature set point may be set individually for each of the first refrigerant and the second refrigerant. Different set points may be used for different modes of operation based on other readings or predetermined information. For example, the time of day, the ambient temperature, the humidity, and considerations may be used by controller 400 or by an operator of cooling system 200 in order to control the flow and/or operation of any of the components of cooling system 200.

In certain embodiments, one or more heat separators 205 may be disposed in series or parallel. For example, heat separator 205 may comprise one or more heat transfer devices. In certain embodiments, the plurality of heat transfer devices are configured in parallel. In certain embodiments, the plurality of heat devices of heat separator 205 are configured in series. In certain embodiments, the plurality of devices of heat separator 205 are configured in both series and parallel. For example, heat separator 205 may comprise four heat transfer devices and configured in two pairs. Each pair being configured in parallel and the two pairs being configured in series. In addition, various configurations may be applied to fluid cooler 220 and/or heat exchanger 216. For example, a plurality of fluid coolers 220 and/or heat exchangers 216 may be configured in cooling system 200. Furthermore, heat separator tank 210 may comprise multiple separation tanks and/or stages within each separation tank 210. In this manner, cooling system 200 may be easily scaled to service larger or more loads 215 efficiently and/or with more control.

Certain embodiments of cooling system 200 may provide one or more technical advantages. For example, cooling system 200 may be more efficient than conventional vapor-compression refrigeration systems used for high capacity cooling or refrigeration. For example, cooling system 200 avoids the inherent inefficiencies of the vapor-compression cycle and may utilize more efficient refrigeration cycles to provide cooling for home and commercial applications, such as for a walk-in freezer or refrigeration unit. As another example, cooling system 200 may use natural refrigerants, e.g., a carbon dioxide refrigerant, without the need for specialized equipment or components, thereby providing high capacity cooling while remaining environmentally conscious. As yet another example, cooling system 200 may require less maintenance compared to existing vapor-compression systems. In particular, the lack of a compressor reduces a major maintenance and failure point in existing conventional vapor-compression cooling systems.

FIG. 3 is a flowchart illustrating a method 300 of operating the example cooling system 200 of FIG. 2. In particular embodiments, various components of cooling system 200 perform the steps of method 300. Method 300 may begin with step 305. In step 305, separator tank 210 separates a first refrigerant into a vapor component and a liquid component. The vapor component and the liquid component may be separated within different portions of separator tank 210 by any suitable means. The liquid component of the first refrigerant may then flow from separator tank 210 heat exchanger 216.

At step 310, heat exchanger 216 uses the liquid component of the first refrigerant to remove heat from a space proximate to load 215. For example, a portion of the liquid component of the first refrigerant may be evaporated at heat exchanger 216 in order to facilitate heat transfer from the ambient air in the space proximate to load 215 to the first refrigerant. After the transfer of heat, the first refrigerant may flow from heat exchanger 216 back to separator tank 210.

At step 315, heat separator 205 may extract heat from a vapor component of the first refrigerant and, using electrical power, move the heat to a second refrigerant. For example, heat separator 205 may receive the vapor component of the first refrigerant from separator tank 210 and using electrical power, extract heat from the vapor component, thereby condensing the first refrigerant, and move the heat to the second refrigerant. In certain embodiments, a portion of the vapor component of the first refrigerant may condense, forming both a vapor component and a liquid component of the first refrigerant. In some embodiments, the entire portion of the vapor component of the first refrigerant condenses, forming solely a liquid component of the first refrigerant. The first refrigerant may flow back to separator tank 210 from heat separator 205.

At step 320, fluid cooler 220 may remove heat from the second refrigerant. For example, after receiving heat at heat separator 205 from the first refrigerant, the second refrigerant may be received at fluid cooler 220. Fluid cooler 220 may pass the second refrigerant through a series of coils to transfer heat from the second refrigerant to the ambient air proximate to fluid cooler 220. In certain embodiments, fluid cooler 220 may use fans to pass air over the coils in order to enhance the transfer of heat from the second refrigerant to the ambient space proximate to fluid cooler 220. In certain embodiments, step 320 may include substeps wherein the second refrigerant is used as part of a heat reclamation system. For example, the second refrigerant may be water that is heated for use of a sanitary water system for a supermarket or restaurant. While certain methods have been described to remove heat from the second refrigerant, any suitable means may be used to remove heat from the second refrigerant.

In particular embodiments, method 300 may comprise additional steps. As an example, there may be additional steps to control the rate of flow of the liquid component of the first refrigerant and a rate of flow of the vapor component of the first refrigerant from the separator tank 210. For example, first pump 225 may control the rate of flow of the liquid component of the first refrigerant from separator tank 210 to heat exchanger 216 and the rate of flow of the vapor component of the first refrigerant from separator tank 210 to heat separator 205. Furthermore, a rate of flow of the second refrigerant may be controlled between a fluid cooler 220 and heat separator 205 using second pump 230. As an additional example, method 300 may include further steps of measuring temperatures and pressures of the first refrigerant and second refrigerant as discussed in reference to FIG. 2 and cooling system 200 above. Method 300 may comprise steps of comparing various temperatures and pressures of the first refrigerant and the second refrigerant and changing the flow of one or more of the first refrigerant and second refrigerant to various components of cooling system 200 based on the comparisons. As yet another example, method 300 may further comprise steps of separating the first refrigerant into a vapor component and a liquid component and discharging the vapor component and the liquid component to heat separator 205 and heat exchanger 216 respectively. Any additional steps, as with any of the steps in method 300, may be carried out by controller 400 coupled to components of cooling system 200 automatically or manually. For example, one or more of steps may be carried out manually by an operator or may be carried out automatically based on predetermined set points or desired operational ranges.

Modifications, additions or omissions may be made to method 300 depicted in FIG. 3. Method 300 may include more or fewer or other steps. For example, steps may be formed in parallel or in any suitable order. While discussed as various components of cooling system 200 performed the steps, any suitable component or combination of components of cooling system 200 may perform one or more of the steps above.

FIG. 4 illustrates an example controller 400 of cooling system 200, according to certain embodiments of the present disclosure. Controller 400 may comprise one or more interfaces 410, memory 420, and one or more processors 430. Interface 410 receives input (e.g., sensor data or system data), sends output (e.g., instructions), processes the input and/or output, and/or performs other suitable operation. Interface 410 may comprise hardware and/or software. As an example, interface 410 receives information (e.g., temperature and/or pressure information) about one or more components of refrigeration system 100 (e.g., via sensors).

Memory (or memory unit) 420 stores information. As an example, memory 420 may store method 300. Memory 420 may comprise one or more non-transitory, tangible, computer-readable, and/or computer-executable storage media. Examples of memory 420 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Processor 430 may include any suitable combination of hardware and software implemented in one or more modules to execute instructions and manipulate data to perform some or all of the described functions of controller 400. In some embodiments, processor 430 may include, for example, one or more computers, one or more central processing units (CPUs), one or more microprocessors, one or more applications, one or more application specific integrated circuits (ASICs), one or more field programmable gate arrays (FPGAs), and/or other logic.

Although the present disclosure includes several embodiments, a myriad of changes, variations, alterations, transformations and modifications may be suggested to one skilled in the art and it is intended that the present disclosure encompasses such changes, variations, alterations, transformations and modifications as fall within the scope of the appended claims.

What is claimed is:

1. An apparatus, comprising:
 a separator tank configured to separate a first refrigerant into a vapor component and a liquid component;
 a heat exchanger exposed to a load configured to use the liquid component of the first refrigerant to remove heat from a space proximate the load, wherein the space comprises at least one of a refrigeration unit and walk-in cooler or freezer;
 a compressor-less heat separator configured to extract heat from the vapor component of the first refrigerant and use electrical power to move the heat to a second refrigerant;
 a fluid cooler configured to remove heat from the second refrigerant;
 a temperature sensor configured to measure a temperature of the second refrigerant; and
 a controller communicatively coupled to the temperature sensor, the controller configured to:
  compare the measured temperature to a temperature set point; and
  based on the comparison between the measured temperature and the temperature set point, increase a rate of flow of the second refrigerant to the fluid cooler.

2. The apparatus of claim 1, wherein the compressor-less heat separator is configured to use a third fluid to extract heat from the first refrigerant and move the heat to the second refrigerant.

3. The apparatus of claim 1, further comprising:
 a first pump configured to control a rate of flow of the liquid component of the first refrigerant from the separator tank to the heat exchanger exposed to the load; and a second pump configured to control a rate of flow of the second refrigerant between the fluid cooler and the compressor-less heat separator.

4. The apparatus of claim 1, wherein the first refrigerant comprises carbon dioxide and the second refrigerant comprises water and glycol.

5. The apparatus of claim 1, wherein the compressor-less heat separator comprises at least one of a thermoelectric, a magnetic, a thermoacoustic, and a Stirling cycle heat transfer device.

6. The apparatus of claim 1, further comprising:
a temperature sensor configured to measure a temperature of the first refrigerant;
a pressure sensor configured to measure a pressure of the first refrigerant; and
a controller communicatively coupled to the temperature sensor and pressure sensor, the controller configured to:
determine a load value based on the measured temperature and pressure;
compare the load value to a set point; and
based on the comparison between the load value and the set point, increase a rate of flow of the liquid component of the first refrigerant to the heat exchanger exposed to the load.

7. The apparatus of claim 1, wherein the separator tank comprises:
a vapor outlet configured to discharge the vapor component of the first refrigerant to the heat separator;
a liquid outlet configured to discharge the liquid component of the first refrigerant to the heat exchanger;
a first inlet configured to receive the first refrigerant from the heat separator; and
a second inlet configured to receive the first refrigerant from the heat exchanger exposed to the load;
wherein the separator tank is configured to use gravity to separate the vapor component and liquid component of the first refrigerant received from the heat exchanger and the heat separator.

8. A method, comprising:
separating a first refrigerant into a vapor component and a liquid component at a separator tank;
removing heat from a space proximate to a load using the liquid component of the first refrigerant from the separator tank, wherein the space comprises a heat exchanger inside a walk-in cooler or freezer;
extracting heat from the vapor component of the first refrigerant and using electrical power to move the heat to a second refrigerant at a compressor-less heat separator;
removing heat from the second refrigerant at a fluid cooler;
measuring a temperature of the second refrigerant;
comparing the measured temperature of the second refrigerant to a temperature set point; and
based on the comparison between the measured temperature and the temperature difference set point, increasing a rate of flow of the second refrigerant to the fluid cooler.

9. The method of claim 8, further comprising:
controlling a rate of flow of the liquid component of the first refrigerant from the separator tank to the load using a first pump; and
controlling the rate of flow of the second refrigerant between the fluid cooler and the heat separator using a second pump.

10. The method of claim 8, wherein the first refrigerant comprises carbon dioxide and the second refrigerant comprises water and glycol.

11. The method of claim 8, wherein the compressor-less heat separator comprises at least one of a thermoelectric, a magnetic, a thermoacoustic, and a Stirling cycle heat transfer device.

12. The method of claim 8, further comprising:
measuring a temperature of the first refrigerant;
measuring the pressure of the first refrigerant;
determining a load value based on the measured temperature of the first refrigerant and the measured pressure of the first refrigerant;
comparing the load value to a set point;
based on the comparison between the load value and the set point, increasing or decreasing a rate of flow of the liquid component of the first refrigerant to the load.

13. The method of claim 8, further comprising:
receiving the first refrigerant from the compressor-less heat separator and the load at the separator tank;
separating the vapor component from the first refrigerant received from the load at the separator tank;
separating the liquid component from the first refrigerant received from the compressor-less heat separator at the separator tank;
discharging the vapor component of the first refrigerant from the separator tank to the compressor-less heat separator; and
discharging the liquid component of the first refrigerant from the separator tank to the heat exchanger.

14. An apparatus, comprising:
a load loop comprising:
a separator tank configured to separate a first refrigerant into a vapor component and a liquid component;
a heat exchanger exposed to a load configured to use the liquid component of the first refrigerant to remove heat from a space proximate to the load, wherein the space comprises at least one of a refrigeration unit and walk-in cooler freezer; and
a first pump configured to:
control a rate of flow of the liquid component of the first refrigerant from the separator tank to the heat exchanger; and
a vapor loop, comprising:
the separator tank; and
a compressor-less heat separator configured to extract heat from the vapor component of the first refrigerant received from the separator tank and use electrical power to move the heat to a second refrigerant;
a fluid loop, comprising:
the compressor-less heat separator; and
a fluid cooler, configured to remove heat from the second refrigerant received from the compressor-less heat separator; and
a second pump configured to control a rate of flow of the second refrigerant between the fluid cooler and the compressor-less heat separator;
a temperature sensor configured to measure a temperature of the second refrigerant in the fluid cycle; and
a controller communicative coupled to the temperature sensor, the controller configured to:
compare the measured temperature to a temperature set point; and
based on the comparison between the measured temperature and the temperature set point, increase a rate of flow of the second refrigerant to the fluid cooler.

15. The apparatus of claim 14, wherein the separator tank comprises:
- a vapor outlet configured to discharge the vapor component of the first refrigerant to the heat separator;
- a liquid outlet configured to discharge the liquid component of the first refrigerant to the load;
- an first inlet configured to receive the first refrigerant from the heat separator; and
- a second inlet configured to receive the first refrigerant from the heat exchanger exposed to the load;
- wherein the separator tank is configured to use gravity to separate the vapor component and liquid component of the first refrigerant received from the heat exchanger and the heat separator.

16. The apparatus of claim 14, wherein the compressorless heat separator is a Stirling cycle cooler.

17. The apparatus of claim 14, further comprising:
- a temperature sensor configured to measure a temperature of the first refrigerant in the load cycle;
- a pressure sensor configured to measure a pressure of the first refrigerant in the load cycle; and
- a controller communicatively coupled to the temperature sensor and pressure sensor, the controller configured to:
  - determine a load value based on the measured temperature and pressure;
  - compare the load value to a set point; and
  - based on the comparison between the load value and the set point, increase a rate of flow of the liquid component of the first refrigerant to the load.

* * * * *

UNITED STATES PATENT AND TRADEMARK OFFICE
CERTIFICATE OF CORRECTION

PATENT NO. : 10,443,786 B2
APPLICATION NO. : 15/668423
DATED : October 15, 2019
INVENTOR(S) : Nicole Z. Martin et al.

It is certified that error appears in the above-identified patent and that said Letters Patent is hereby corrected as shown below:

In the Claims

In Column 14, Line 61, please delete "...a controller communicative coupled.." and please insert -- a controller communicatively coupled... --, therefor.

Signed and Sealed this
Third Day of May, 2022

*Katherine Kelly Vidal*
Katherine Kelly Vidal
*Director of the United States Patent and Trademark Office*